United States Patent [19]

Toriumi

[11] 4,454,538
[45] Jun. 12, 1984

[54] DATA COMMUNICATION IN CATV SYSTEM

[75] Inventor: Hiroshi Toriumi, Tokyo, Japan

[73] Assignee: Pioneer Electronic Corporation, Tokyo, Japan

[21] Appl. No.: 401,431

[22] Filed: Jul. 23, 1982

[30] Foreign Application Priority Data

Jul. 24, 1981 [JP] Japan .............................. 56-116859

[51] Int. Cl.³ ............................................. H04N 7/10
[52] U.S. Cl. ............................................ 358/86; 455/5
[58] Field of Search ..................... 358/86; 455/5, 4, 3

[56] References Cited

U.S. PATENT DOCUMENTS

| 3,987,398 | 10/1976 | Fung | 455/5 |
| 4,347,604 | 8/1982 | Saito | 455/5 |
| 4,386,365 | 5/1983 | Gargini | 455/5 |
| 4,404,589 | 9/1983 | Wright | 358/86 |

Primary Examiner—Howard W. Britton
Attorney, Agent, or Firm—Sughrue, Mion, Zinn, Macpeak & Seas

[57] ABSTRACT

A CATV system having a central facility connected through cables to a number of terminal units to establish two-way data communication. Each terminal unit includes a PLL that oscillates at a frequency corresponding to a channel selected. A frequency divider circuit subjects an output frequency of the PLL circuit to frequency division to provide a carrier frequency for an up-stream data signal. The central facility transmits programs and down-stream data signals through a plurality of channels. Each terminal unit transmits an up-stream data signal to the central facility by using an exclusive frequency corresponding to a channel selected.

10 Claims, 6 Drawing Figures

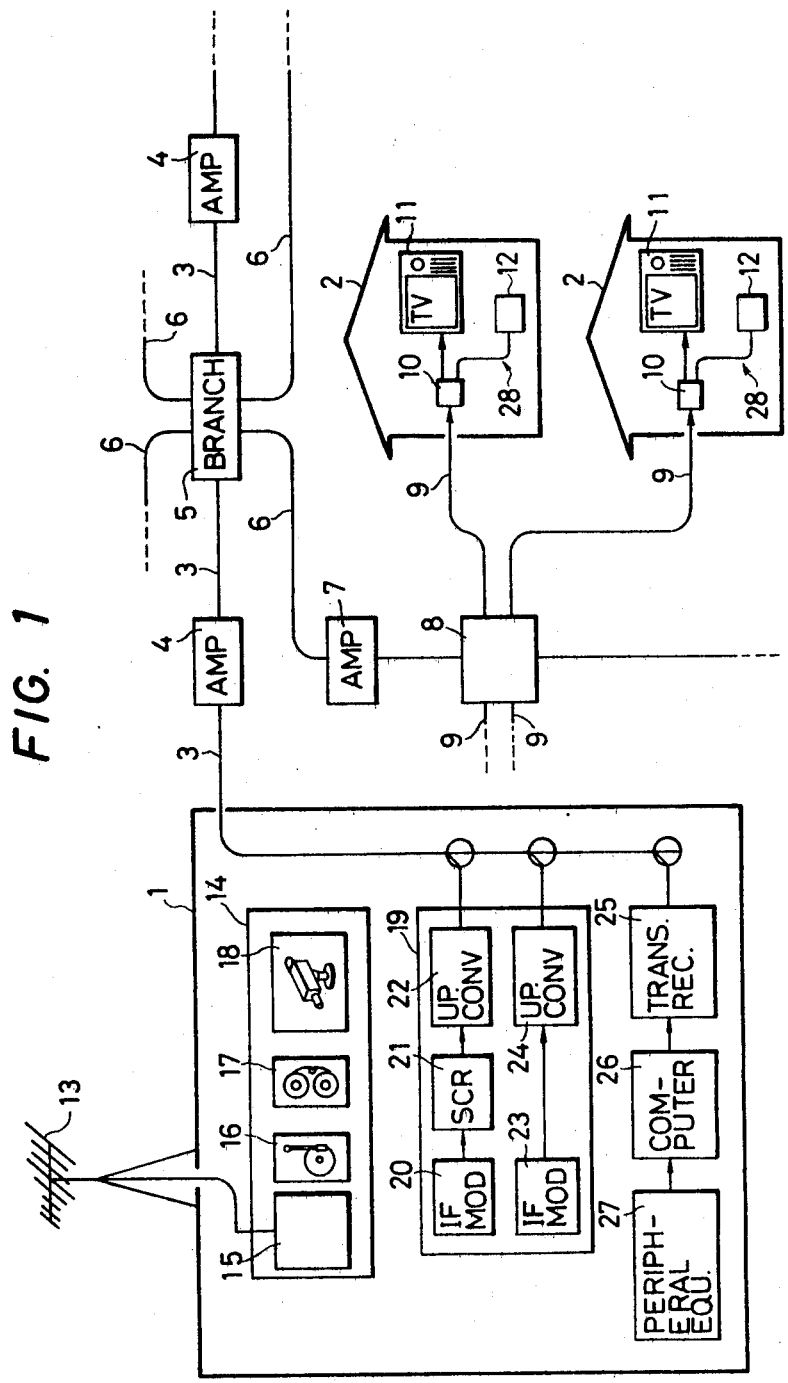

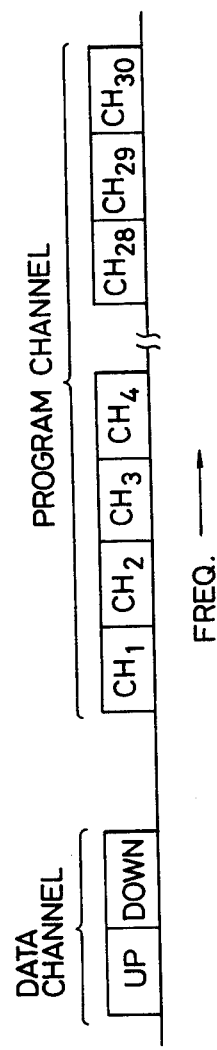
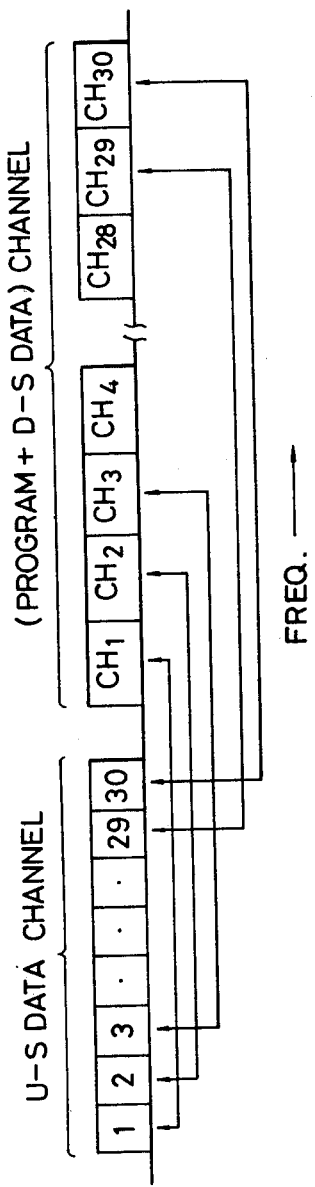

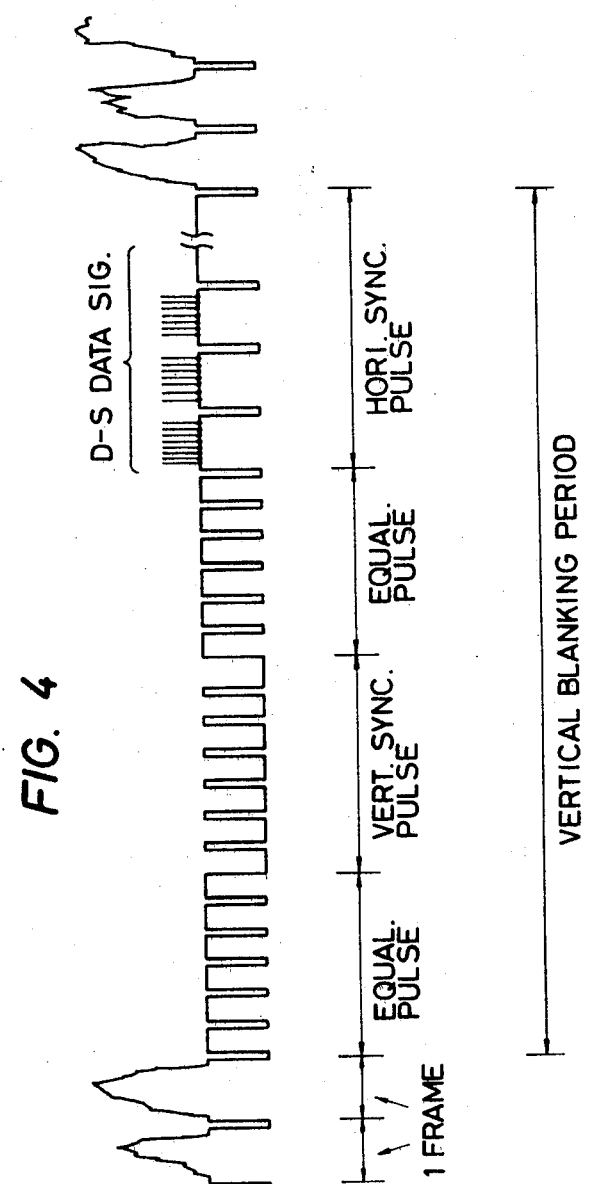

DATA COMMUNICATION IN CATV SYSTEM

BACKGROUND OF THE INVENTION

This invention relates generally to a CATV system in which a central facility is connected through cables to a plurality of terminal units in a manner such that two-way data communication is effected therebetween. More particularly, it is related to a data communication method in such a CATV system in which for each channel an exclusive downstream data signal is inserted and a responsive up-stream data signal from each terminal unit is transmitted through a channel in correspondence to the down-stream channel used. In this manner data communications can be carried out separately through the channels, and frequency dividers are used to readily determine the carrier frequencies of the upstream data signals.

A typical CATV system will now be described with reference to FIG. 1. The CATV system includes a single base or center 1 and terminal units 28 which are provided, for example, in several tens of thousands of subscriber's homes. The center 1 is connected through coaxial cables to the terminal units 28. A main cable 3 extends from the center 1, and main cable amplifier 4 and branching units 5 are provided at predetermined positions along the main cable 3. A plurality of branch cables 6 extend from each branching unit 5. Extension amplifiers 7 and tap-off units 8 are provided at predetermined points along the branch cables 6. Each tap-off unit 8 is connected to branch lines 9 which extend to the terminal units 28 within the individual homes 2. Each terminal unit 28 includes a main unit 10, a television set 11 and a control unit 12. The branch lines 9 is connected to the main unit 10, which is in turn connected to the television set 11 and to the control unit 12. As is apparent from the above description, the main cable extending from the center is branched into a first plurality of branch cables, which are in turn further branched into a second plurality of branch lines which are connected to the terminal units 28.

A signal receiving antenna 13 is installed outside the center 1. The antenna 13 is connected to a demodulator 15 in a source group 14 of the center 1. The source 14 further includes a video disc player 16, a video tape recorder 17 and a studio 18. The output signals of the source group 14 are applied to a modulation output section 19 composed of two systems. One of the two systems includes an IF modulator circuit 20, a scramble circuit 21, and an up-converter circuit 22, and the other system includes an IF modulator circuit 23 and an up-converter circuit 24. The outputs of the up-converters 22 and 24 are connected to the main cable 3, to which a data transceiver 25 is connected for data communication between the center 1 and each main unit 10. The data transceiver 25 is connected to a computer 26 which is connected to a peripheral unit 27 such as a printer or a display unit.

The operation of the CATV system thus constructed will now be described.

First, the power switch of the television set 11 is turned on. With the television set 11 set to a particular unused channel, the control unit 12 is operated so that the frequency of a desired channel to be received is set to that of the unused channel. The channels which can be selected by the control unit 12 as described above can be classified into three groups of channels, to wit (A) "retransmission programs" in which television signal from local stations are received without modification; (B) "independent programs" (free of charge); and (C) "chargeable" (pay) programs. Each group is allocated ten channels, and therefore any of the thirty channels can be selected by operating the control unit 12.

(A) Retransmission programs.

Television signals received by the antenna 13 are demodulated by the demodulator 15 and applied to the modulation output section 19. The signal thus applied is modulated by the IF modulator circuit 23. The frequency of the signal thus modulated is increased to a predetermined frequency by the up-converter circuit 23 according to a determined frequency allocation scheme. That is, it is assigned to a predetermined channel. The resultant signal is then applied through the main cable 3, the branch cables 6, and the branch lines 9 to the television sets 11.

(B) Independent programs

The independent programs include locally originating programs such as weather forecast programs, news programs, and the like. In the case of programs recorded on discs of the video disc player 16, on the video tape recorder 17 or in the case of live programs produced in the studio 18, the video signal is modulated by the IF modulator circuit 23 and the frequency of the signal thus modulated is increased to that of a predetermined channel by the up-converter circuit 24. The resultant signal is applied to the main cable 3. Reception of these programs is free of charge. That is, the "price" of these programs is included in the basic monthly charge paid by the subscriber.

(C) Chargeable programs

The chargeable programs include new movie programs, special programs, and the like. In the case of programs provided by the video disc player 16, the video tape recorder 17, or in the case of live programs produced in the studio 18, the video signal is modulated by the IF modulator circuit and is processed by the scrambler circuit 21 such that the signal cannot be reproduced without special signal processing. Then, the frequency of the signal is increased to that of a predetermined designated channel, and is applied to the main cable 3. In order to receive the chargeable programs, the video signal must be descrambled by the main unit 10 in the subscriber's home 2. The subscriber is charged for the reception of the chargeable programs. That is, predetermined charges therefor are summed, and the user is requested to pay a special charge at a measured rate in addition to the basic monthly charge.

As described above, the center 1 is connected through coaxial cables to the terminal units in the subscribers' homes 2. However, in order to charge the subscribers for the reception of the chargeable programs, it is absolutely necessary to detect which subscribers receive which channels. That is, it is necessary to detect the channels which have been selected by the subscribers at various times. In order to meet this requirement, the data transceiver 25 outputs a retrieving signal at predetermined time intervals so that the terminal units 28 are called via their assigned address numbers. That is, the channels received by the terminal units at the time of transmission of the retrieving signal are detected in a manner hereinafter referred to as "polling". In response to this polling signal, each terminal unit 28 "answers" the data transceiver 25 with data representative of the channel received by the terminal unit at the time of polling. Various reception and transmission data for the data transceiver 25 are arranged and stored by the computer 26 and are displayed or printed out by the peripheral unit 27. The polling operation is carried out at predetermined time intervals of several seconds to several tens of seconds and therefore audience ratings can be readily calculated. The subscribers may also participate in the production of programs. In this case, by operating the control units 12, they can answer questions proposed in a program or the like while watching the television sets 11. The answers are transmitted through the coaxial cables to the center 1.

A data communication method for carrying out the polling as described above will now be explained with reference to FIG. 2. Several tens of program channels (as many as the number of programs which the center 1 provides) are typically assigned at predetermined frequency intervals. In addition to these program channels, data channels are assigned. More specifically, data channels are provided for down-stream data and up-stream data which are different from each other in frequency. With this assignment, when polling is made to a terminal unit 28, the address number of the terminal unit 28 is called through one down-stream data channel, and data from the terminal unit 28 thus called is transmitted to the center 1 through one up-stream data channel. Therefore, no matter what program or programs the terminal units 28 are receiving, the terminal units 28 are forced to use the up-stream data channel and the down-stream channel in transmission and reception of polling data. Accordingly, while polling is made to terminal units 28 which enjoy a particular program, the remaining terminal units 28 cannot make data communication with the center 1; i.e., the polling cannot be carried out freely through each channel. Since the polling is made to all the terminal units 28 by the use of the single down-stream data channel, the period of polling is necessarily increased, and it thus cannot be expected that the terminal units 28 can quickly respond to the polling signals.

In order to overcome this difficulty, a method has been proposed in the art in which the up-stream data signals are inserted into the channels for the programs, and the up-stream data signals are transmitted through the respective channels such that two-way data communication can be carried out for each channel. However, this method necessitates the presence of a first intermediate frequency oscillating VCO (voltage-controlled oscillator) for receiving a program channel and a second carrier wave oscillating VCO for transmitting an up-stream data signal. Accordingly, this method is disadvantageous in that the amount of hardware is necessarily increased, decreasing the channel adjustment capabilities of the terminal units.

SUMMARY OF THE INVENTION

It is thus an object of the present invention to produce a polling communications method by which the polling operation can be quickly completed without materially adding to the receiver hardware.

This and other objects of the present invention are realized by providing a PLL in each terminal unit which is adapted to perform local oscillation for receiving a program's channel. The PLL 6 is frequency-divided by a frequency divider circuit, and the output of the frequency divider circuit is used as a carrier frequency for transmitting an up-stream data signal. Thus, the arrangement is simple, the volume is small, and the number of points to be adjusted is decreased.

BRIEF DESCRIPTION OF THE DRAWINGS

FIG. 1 is an explanatory diagram outlining an CATV system,

FIG. 2 is an explanatory diagram showing the assignment of channels in a conventional data communication, FIG. 3 is an explanatory diagram showing the assignment of channels in a data communication according to the present invention, FIG. 4 is a waveform diagram showing a pattern in which down-stream data signals are inserted in vertical synchronization signals.

DESCRIPTION OF THE PREFERRED EMBODIMENTS

FIG. 3 shows the assignment of channels in the embodiment of the present invention. Several tens of "program+down-stream data" (P+DS) channels, which is equal to the number of programs the center 1 transmits, are assigned with different frequencies. The P+DS channels include the video signals, audio signals and down-stream data signals which are transmitted to the terminal units 28 by the center 1. A plurality of up-stream data channels are assigned to a frequency range which is lower than that of the P+DS channels. The number of up-stream data channels is equal to that of programs which the center 1 provides for the terminal units, corresponding in number to the aforementioned P+DS channels. Accordingly, when a terminal unit selects a program, the frequency of up-stream channel is automatically set to the channel which corresponds to the program. Therefore, two-way data communication can be effected by the up-data channel and the P+DS channel between the center 1 and the terminal unit 28.

FIG. 4 shows a pattern in which down-stream data signals are inserted in the video signal of a program. Vertical synchronizing pulses are provided for the video signal, for the synchronization for every frame. Empty fields are provided after the vertical synchronizing pulses and the equalizing pulses. In general, the empty fields last from 8H to 12H in duration. The down-stream data signals are inserted into empty fields corresponding to 8H, so that the program's video signals and the down-stream data signals are transmitted simultaneously. A vertical synchronizing circuit is provided for the terminal unit 28, so that the vertical synchronizing pulses are detected as timing signals. That is, the down-stream data signals can be readily separated from the video signals by reading the down-stream data signals from the predetermined fields which occur after the provision of the timing signals.

Figure 5:
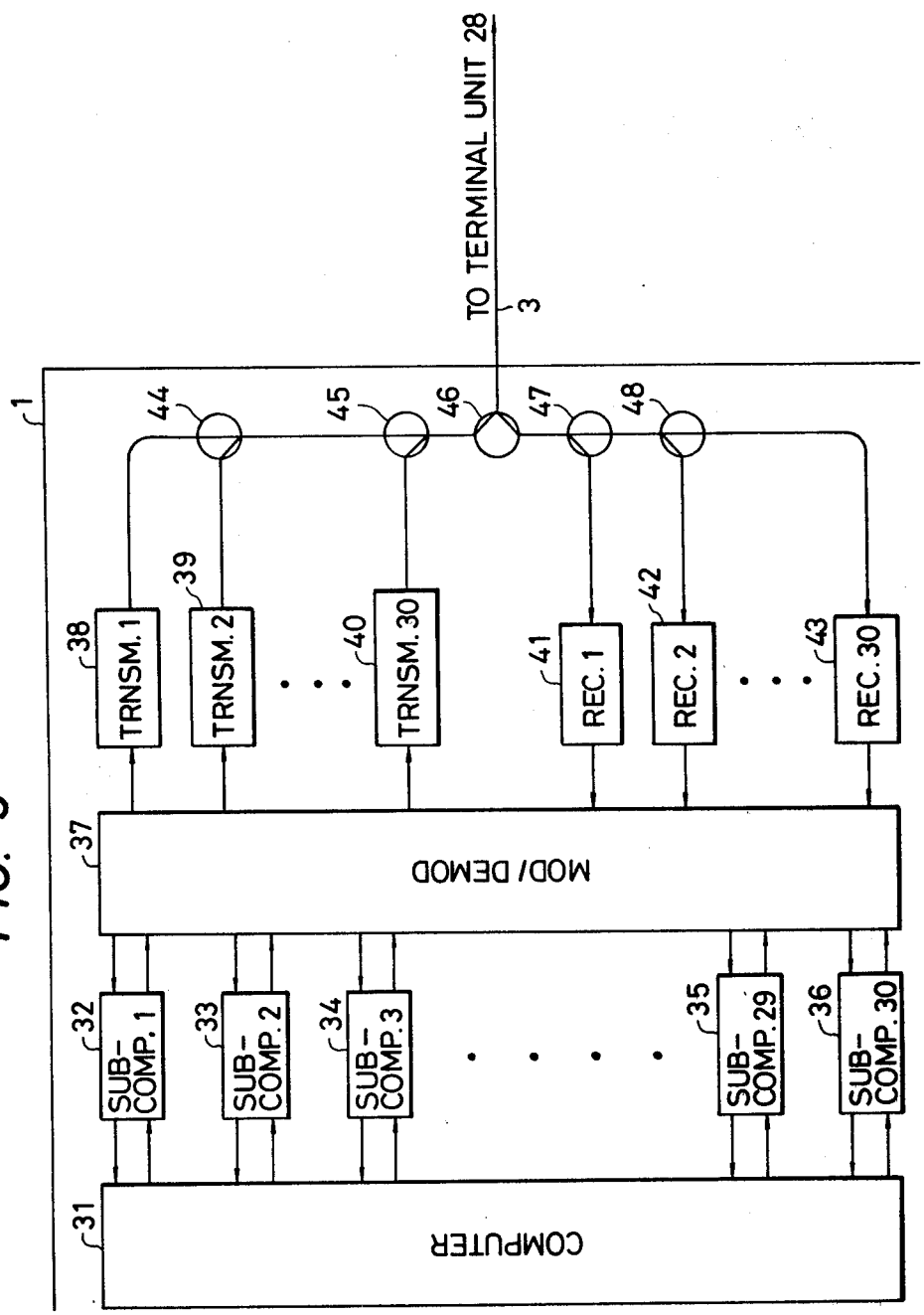
FIG. 5 is a block diagram showing a central facility according to one embodiment of the present invention.

FIG. 5 shows the arrangement of a data signal receiving means in the center 1 according to an embodiment of the present invention. A large computer 31 is connected to small sub-computers 32 through 36, to which a modulator/demodulator 37 is connected. The choice of computers is well established in CATV technology. The modulator/demodulator 37 is further connected to transmitters 38 through 40 and receivers 41 through 43. The number of transmitters is equal to the number of program channels as is the number of receivers. The frequencies of the transmitters 38 through 40 are equal to the frequencies of the program channels provided by the center 1, while the frequencies of the receivers 41 through 43 are different from one another. The transmitters 38 through 40 and the receivers 41 through 43 are connected through branch units 44 through 48 to a main cable 3.

Figure 6:
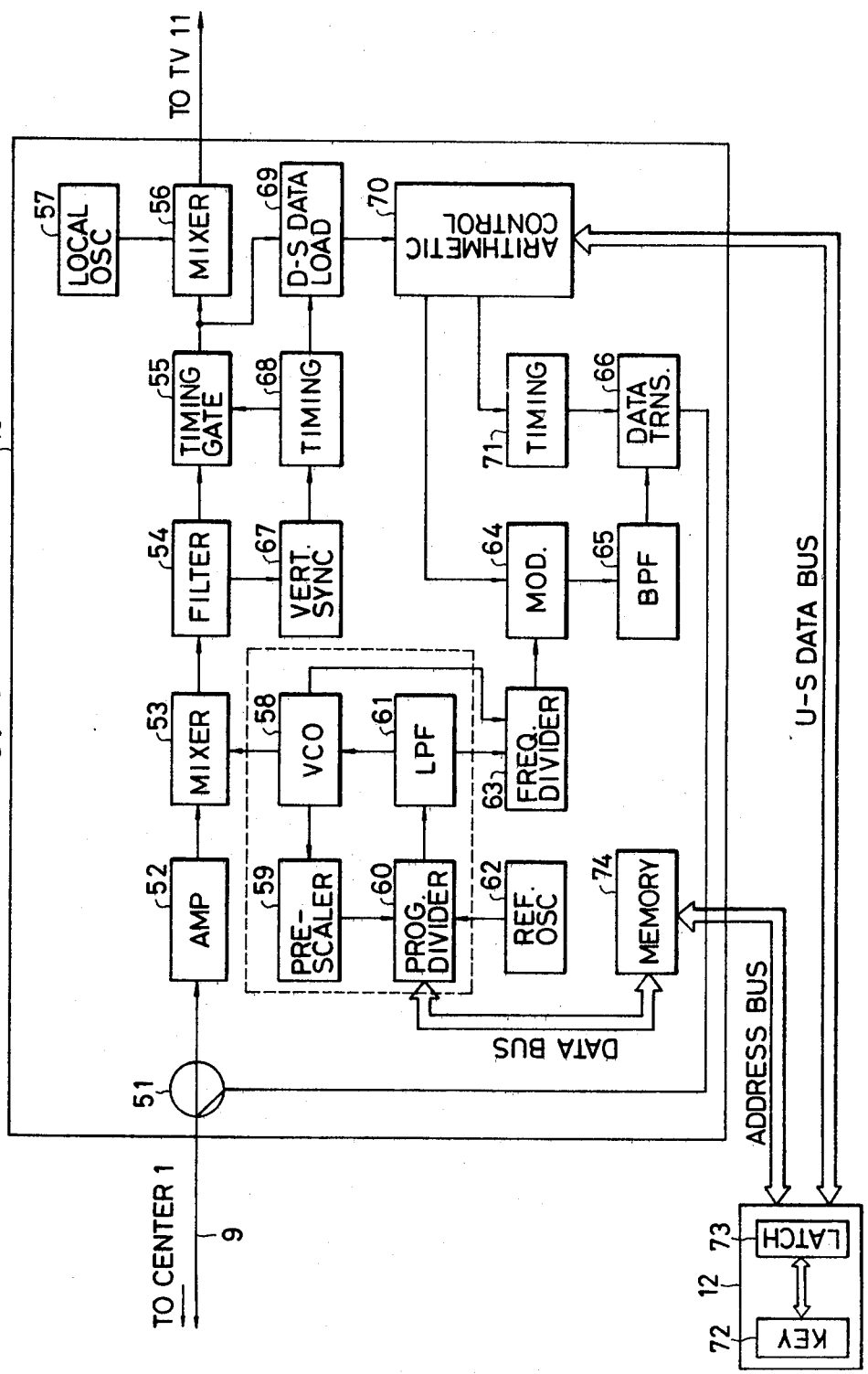
FIG. 6 is a block diagram showing a terminal unit according to one embodiment of the present invention.

FIG. 6 shows the internal arrangement of the terminal unit 28 according to an embodiment of the present invention. A branch cable 9 is connected to a series circuit in the main box 10 consisting of a branch unit 51, a high frequency amplifier circuit 52, a first mixer circuit 53, a filter 54, a timing gate circuit 55 and a second mixer circuit 56. The output of the mixer circuit 56 is connected to a television set 11. The output of a local oscillator 57 is applied to the mixer circuit 56. The output of a VCO (voltage-controlled oscillator) 58, the oscillation-frequency of which is varied with the input voltage, is applied to the first mixer circuit 53. The VCO 58 is connected through a prescaler 59 to a programmable divider 60 incorporating a phase converter. The output of a reference oscillation circuit 62 is applied to the programmable divider 60, the output of which is applied through a low-pass filter 61 to the VCO 58. The VCO 58, the prescaler 59, the programmable divider 60 and the low-pass filter 61 form a PLL circuit (encircled with the broken line in FIG. 6).

A part of the output of the VCO 58 is applied to a frequency divider circuit 63, the output of which comprises the carrier frequency for the up-stream data transmission. The output of the frequency divider circuit 63 is connected through a modulator circuit 64 and a band-pass filter 65 to a data transmitting circuit 66.

The filter 54 is connected to a vertical synchronizing circuit 67, which is connected to a timing circuit 68. The output of the timing circuit 68 is applied to the timing gate circuit 55 and to a down-stream data loading circuit 69. The output of the timing gate circuit 55 is applied to the down-stream data loading circuit 69, the output of which is supplied to an arithmetic control circuit 70. The output of the arithmetic control circuit 70 is applied to the modulator circuit 64 and a timing circuit 71 which is connected to the data transmitting circuit 66. The data transmitting circuit 66 operates to transmit up-stream data signals, and is connected through the branch unit 51 to the branch cable 9.

A key 72 which is operated in association with a push button is provided in the control box 12. The key 72 is connected through a bus line to a latch circuit 73. The latch circuit 73 is connected through an up-stream data bus to the arithmetic control circuit 70. The latch circuit 73 is further connected through an address bus to a station selection memory 74 in the above-described main box 10. The station selection memory 74 is connected through a data bus to the programmable divider 60.

The operation of the embodiment thus organized will now be described.

The center 1 has the transmitters 38 through 40 the number of which is equal to the number of programs. The transmitters 38 through 40 use different frequency channels, so that the video signals mixed with the data signals as shown in the FIG. 4 are transmitted through the main cable 3. The receivers 41 through 43, the number of which is also equal to that of programs, can receive the up-stream data signals respectively with different frequency channels. The transmitters 38 and 39 are provided in correspondence to the receivers 41 and 42, respectively. That is, combinations of the transmitters 38 through 40 and receivers 41 through 43, the number of which is equal to the number of programs, are provided.

The transmitters and receivers are connected through the modulator/demodulator 37 to the sub-computers 32 through 36. The sub-computer 32 is connected to the transmitter 38 and the receiver 41, the sub-computer 33 is connected to the transmitter 39 and the receiver 42, and so forth. That is, one transmitter (38, 39 or 40), one receiver (41, 42 or 43) and one sub-computer (32, 33, 34, 35 or 36) are used for the data communication with respect to one program. Controlling the sub-computers 32 through 36 and recording data are carried out by the main computer 31.

When the terminal unit 28 selects a program by operating the key 72 on the control box 12, the operation signal is applied to the latch circuit 73 and is further applied through the address bus to the station selection memory 74, where the selection of the program is stored. The station selection memory 74 applies a signal corresponding to the selected program to the programmable divider 60, so that the reference oscillation frequency of the reference oscillation circuit 62 is divided into a particular frequency. The output of the programmable divider 60 is applied through the low-pass filter 61 to the VCO 58. The VCO outputs a local oscillation wave having a frequency corresponding to the selected channel. A part of the output of the VCO 58 is applied through a prescaler 59 to the programmable divider 60, to stabilize the oscillation frequency of the VCO 58.

Conversely, the program transmitted from the center 1 is subjected to high frequency amplification in the amplifier circuit 52 and is then applied to the mixer circuit 53. The output of the amplifier circuit 52 is mixed with the local oscillation signal of the VCO 58, thus providing an intermediate frequency signal. The intermediate frequency signal is applied through the filter 54 and the timing gate circuit 55 to the mixer circuit 56, where the frequency thereof is reduced by being mixed with the local oscillation signal from the local oscillator 57. The output signal of the mixer circuit 56 is applied to the television set 11.

The intermediate frequency signal outputted by the mixer circuit 53 is applied through the filter 54 to the vertical synchronizing circuit 67, where only the vertical synchronizing signal inserted in the video signal of the program is detected so as to be applied to the timing circuit 68. The timing circuit 68 applies the control signal, which is provided by the vertical synchronizing signal, to the timing gate circuit 55 and the down-stream loading circuit 69, so that the down-stream data signal provided for a predetermined period of time after the vertical synchronizing signal is introduced to the down-stream data loading circuit and the content of the down-stream data signal is applied to the arithmetic control circuit 70. The arithmetic control circuit 70 outputs an up-stream data signal corresponding to the content of the down-stream data signal. A part of the output of the VCO 58 is applied to the frequency divider circuit 63, so that the reference oscillation signal of the VCO is frequency-divided in a predetermined frequency division ratio in the frequency divider circuit 63.

The oscillation signal thus treated has the frequency of an up-stream data channel corresponding to the channel of the program which has been selected by the control box 12. The carrier wave, which is the output of the frequency divider circuit 63, is applied to the modulator circuit 64. In the modulator circuit 64, the carrier wave from the VCO 58 is modulated with the up-stream data signal from the arithmetic control circuit 70. The modulated signal is supplied through the band-pass filter 65 to the data transmitting circuit 66. On the other hand, the arithmetic control circuit 70 supplies a control signal to the timing circuit 71 so that the up-stream data signal is transmitted with predetermined timing. With the aid of the control signal, the timing circuit 71 operates to open the data transmitting circuit 66, so that the modulated signal including the up-stream data signal, which is provided by the modulator circuit 64, is transmitted through the branch unit 51 to the center 1.

When one of the programs is selected with the control box 12 of the terminal unit 28 and watched on the television set 11, an up-stream data signal channel corresponding to the channel of the program is set, and in the terminal unit the down-stream data signal included in the video signal of the program is introduced to the arithmetic control circuit 70. The up-stream data signal is transmitted to the center 1 by the use of a channel inherent to the program. Thus, the data communications of the programs are carried out with the up-stream data channels inherent thereto. In polling all the terminal units 28, the polling is carried out for each P+DS channel with the address number and the down-stream data signal inserted in the video signal of each program, and the up-stream data signals from the terminal units 28 which are operating their own television sets are transmitted through the up-stream data channels inherent thereto. Accordingly, in the center 1, the receivers 41 through 43 receive the up-stream data signals, and the up-stream data signals thus received are applied through the modulator/demodulator 37 to the respective sub-computers 32 through 36, where they are analyzed and summed up. Therefore, the period of polling can be decreased when compared with that in the case where the up-stream data signals from all the terminal units 28 are received through only one up-stream data channel. In the case of a program in which particular subscribers take part, answer data from the terminal units which enjoy the program must be received. In this case, although the polling is not effected with the program, with other programs the polling can be carried out by the use of the up-stream data channels inherent thereto.

As is apparent from the above description, according to the invention, two-way data communication can be freely carried out separately according to the channels of the programs which are transmitted by the center 1. As it is unnecessary to provide the channel data of a program which the terminal unit is receiving for the up-stream data signal, the period of polling can be reduced. Since the down-stream data signal is inserted in the video signal of each program, it is unnecessary to use the channel for the down-stream data signal, and accordingly the frequency band can be economically used for the program channels. Furthermore, as the frequency of the carrier wave for the up-stream data signal can be obtained by frequency-dividing the frequency of the local oscillation which is set up by the PLL circuit in selection of a station, and the construction is simplified. Accordingly, the volume can be reduced, and the number of points to be adjusted can be decreased, which contributes to an improvement of the reproducibility.

What is claimed is:

1. In a CATV system in which a central facility is connected through a plurality of cables to a number of terminal units such a manner that two-way communication can be effected between said central facility and said terminal units, wherein an input signal at a first frequency sent from said facility and said terminal units comprises a video signal component and a discrete terminal unit signal component, said first frequency of said input signal corresponding to a first program channel, and an output signal at a second frequency sent from said terminal units to said facility comprises a discrete terminal unit output signal, said terminal units comprising:
   means for producing a first signal substantially equal in frequency to said first frequency of said input signal corresponding to said first program channel;
   mixing means for mixing said first signal with said input signal and producing a second signal;
   means for extracting said discrete terminal unit signal component from said second signal, and producing a third signal;
   means for receiving said third signal and producing said output signal; and
   means for transmitting said output signal to said facility, said second frequency of said output signal being substantially a preset fraction of said first frequency of said input signal corresponding to said first program channel.

2. The CATV system of claim 1 further comprising:
   latch means for outputting a preselected first signal determination signal to said means for producing said first signal, and for outputting a preselected output signal determination signal to said means for receiving said third signal and producing said output signal.

3. The CATV system as in claim 2, wherein said means for producing said first signal comprises; a PLL having frequency signal inputs from a program channel frequency memory and a reference oscillator, said program channel frequency memory receiving as its input the output of said latch means.

4. The CATV system as in claim 2, wherein said means for producing said output signal comprises; an arithmetic control unit which receives as its inputs both of said third signal and said output of said latch means.

5. The CATV system of claim 1, wherein said means for transmitting said output signal comprises a modulator which receives as one input said output signal and receives as another input the output of a frequency divider which receives said first signal as its input.

6. The CATV system of claim 1 wherein said means for transmitting said output signal further comprises a data transmission circuit which receives as one input the output of a timing circuit which derives its input from said means for producing said output signal, and which receives as another input the output of a filter which receives as its input the output of said modulator.

7. A CATV system comprising; a central facility which is connected through a plurality of cables to a number of terminal units in such a manner that two-way communication can be effected between said central facility and said terminal units;
   an input signal at a first frequency from said central facility to said terminal units comprises a video signal component having a vertical blanking period and a discrete terminal unit input signal component, said discrete terminal unit input signal component being transmitted in time within said vertical blanking period of said video signal component, said first frequency of said signal from said central facility to said terminal units corresponding to a first program channel; and wherein an output signal from said terminal unit to said central facility comprises a discrete terminal unit output signal, said signal from said terminal unit to said central facility being at a second frequency which is an approximate preselected fraction of said first frequency corresponding to said first program channel.

8. A CATV system as in claim 7, wherein said vertical blanking period of said video signal comprises; a vertical synchronization pulse, a plurality of equalization pulses, and a plurality of empty fields, said discrete terminal unit input signal being transmitted concurrently with said empty fields.

9. The CATV system of claim 1 or claim 7, wherein said central facility comprises:
- a plurality of video signal sources, producing a video signal;
- a modulation output section for modulating said video signal at a frequency corresponding to a particular one of a plurality of program channel; and
- means for producing said two-way communications said means comprising peripheral input signal means, a central computer, a plurality of sub-computers of a number equivalent to the number of said program channels, a modulator/demodulator unit, a plurality of transmitters and a plurality of receivers, each of said plurality of transmitters and said plurality of receivers being of a number equivalent to the number of said sub-computers.

10. A CATV system in which a central facility is connected through a plurality of cables to a number of terminal units in such a manner that two-way communications can be effected between said central facility and said terminal units, said central facility comprising:
- a plurality of video signal sources, producing a video signal;
- a modulation output section for modulating said video signal at a frequency corresponding to a particular one of a plurality of program channel; and
- means for producing said two-way communications said means comprising peripheral input signal means, a central computer, a plurality of sub-computers of a number equivalent to the number of said program channels, a modulator/demodulator unit, a plurality of transmitters and a plurality of receivers, each of said plurality of transmitters and said plurality of receivers being of a number equivalent to the number of said sub-computers.

* * * * *